O. LEHMANN.
ROAD VEHICLE SIGNAL.
APPLICATION FILED MAR. 29, 1920.
1,379,996.
Patented May 31, 1921.
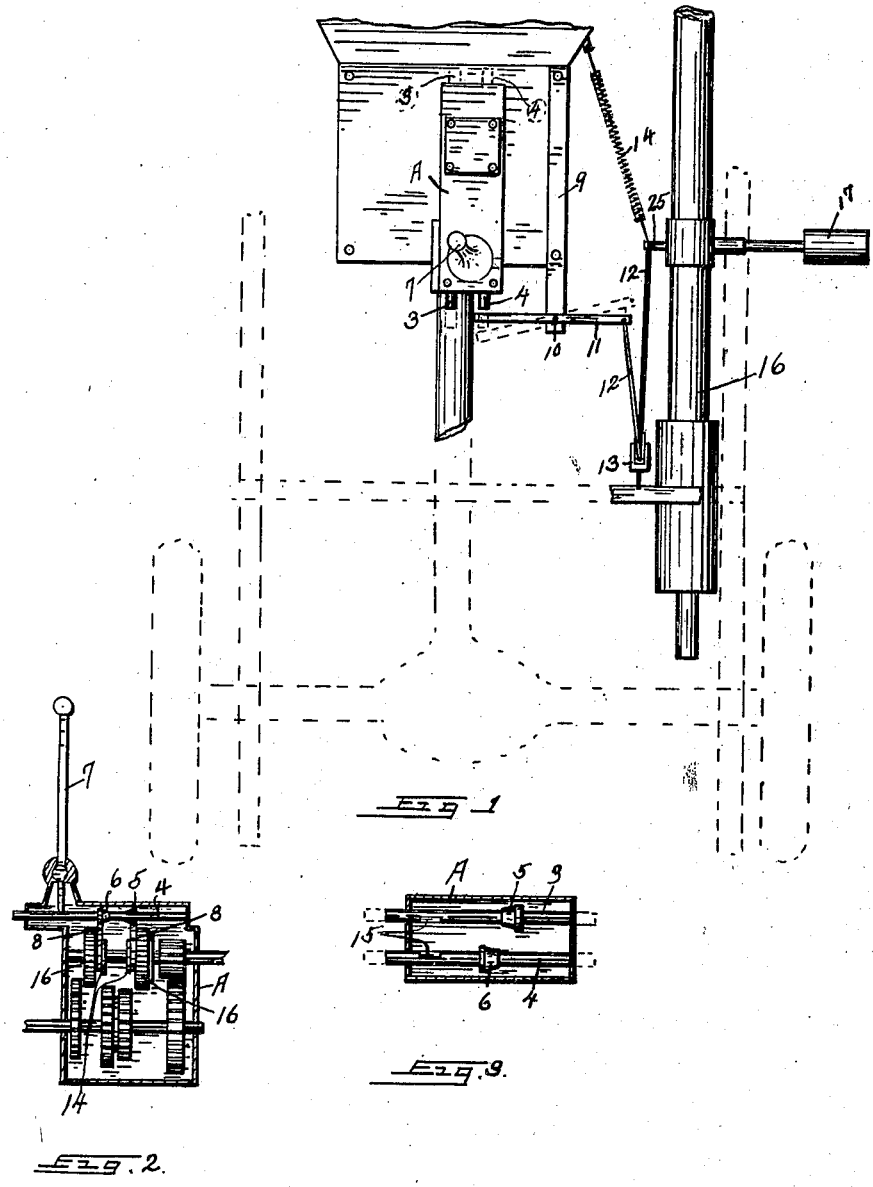

UNITED STATES PATENT OFFICE.

OSCAR LEHMANN, OF SALT LAKE CITY, UTAH.

ROAD-VEHICLE SIGNAL.

1,379,996.  Specification of Letters Patent.  Patented May 31, 1921.

Application filed March 29, 1920. Serial No. 369,484.

*To all whom it may concern:*

Be it known that I, OSCAR LEHMANN, a citizen of the United States, residing at Salt Lake City, in the county of Salt Lake and State of Utah, have invented certain new and useful Improvements in Road-Vehicle Signals, of which the following is a specification.

My invention relates to road vehicle signals, and has for its object to provide an apparatus for attachment on road vehicles which will give an audible signal when the motive power on the vehicle is connected or shifted preparatory to backing the vehicle and which will continue to sound as long as the motive power is connected in the reverse action.

These objects I accomplish with the apparatus illustrated in the accompanying drawings in which similar letters and numerals of reference indicate like parts throughout the several figures and as described in the specification forming a part of this application and pointed out in the appended claim.

In the drawings in which I have shown a substantial embodiment of my invention, Figure 1 is a plan view of the apparatus on the chassis of an automobile. Fig. 2 is a section of the transmission case and a side elevation of the gears and shifting mechanism carried therein, somewhat enlarged from Fig. 1. Fig. 3 is a plan view of the rods or shafts with which the shifting mechanism engages.

In using road vehicles it is frequently necessary to back the vehicle at places where injury might occur to persons and animals unless some warning is given of the backward movement in time to avoid the injury, and the operator frequently forgets to give the warning. The present invention automatically gives such warning before and while the vehicle is being moved rearwardly thus avoiding accidents from such rearward movement, and consists of a transmission case A, within which two parallel shafts or rods 3 and 4 are journaled and on each of said shafts is secured its respective collar 5 and 6 which is shifted longitudinally with its shaft. In each of said shafts 3 and 4 a recess 15 is formed and said recesses open toward each other. The shifting lever 7 is fulcrumed above said shafts 3 and 4 with its lower end adapted to operate within either of said recesses 15 as desired. Secured on or integral with said collars 5 and 6 are the forks 8 which engage with the annular flange 14 that is integrally formed on the gears 16 and by which said gears are shifted. Each of the said shafts or rods 3 and 4 are carried in said transmission case A, with the end portions of said shafts bearing on and protruding through the ends of said case. The shaft or rod 4 is operatively connected with the low and reverse mechanism of the transmission, while the shaft 3 is operatively connected with the intermediate and high mechanism of the engine. As my signal is connected with and sounds only when the engine has been shifted into reverse position, I will describe only such parts of the transmission mechanism as relate to the reverse position.

A brace 9 is fastened to the chassis of the automobile with its rear end extended as at 10 and a signal sounding lever 11 is pivoted at its fulcrum to said brace 9 at the point 10. One end of said lever 11 is held adjacent the end of said shaft 4 by the cable 12 which is fastened to the other end of said lever and is then passed over a sheave pulley 13 which in turn is secured to the chassis of the automobile. The other end of said cable 12 is fastened to a spring 14 and a cut out lever 25. I use any of the well known cut outs which are attached to the exhaust pipe 16 and are operated by a lever, and I use the same lever which I have shown as lever 25. I provide an audible whistle 17 which is made to sound by the exhaust gas of the engine. The spring 14 returns said signal sounding lever 11 and said cut out lever 25 to normal position when the engine is thrown out of reverse position, as shown in dotted lines in Fig. 1.

The operation of my apparatus is as follows:

When the operator desires to run the vehicle backward he throws said lever 7 to cause its lower end to enter said slot 15 in shaft 4, and then when said lever is shifted or thrown toward the front the said shaft 4 will be moved toward the rear of the transmission case. As said shaft 4 is moved toward the rear the fork 8 carried thereon will move the gear 16 into mesh with the reverse mechanism of the car or vehicle, and as said shaft 4 is thus moved longitudinally to the rear the lever 11 and its connections, cable 12 and lever 15, will be moved which will cause the signal 17 to sound. The signal will continue to sound when the vehicle is being moved toward the rear and will be discontinued as soon as the lever 7 is thrown into the neutral or into the forward position.

Having thus described my invention I desire to secure by Letters Patent and claim:—

A signal for road vehicles comprising a longitudinally movable shaft of the reverse mechanism of an automobile, means to move said shaft longitudinally, a lever medially pivoted and with one end portion adjacent the end of said shaft; and an audible signal connected with the other end of said lever and adapted to sound when said shaft is moved longitudinally.

In testimony whereof I have affixed my signature.

OSCAR LEHMANN.